(12) United States Patent
Jaeger et al.

(10) Patent No.: US 11,572,144 B1
(45) Date of Patent: *Feb. 7, 2023

(54) OUTBOARD MOTOR COWLING WITH COOLING WATER EGRESS SYSTEM

(71) Applicant: Brunswick Corporation, Mettawa, IL (US)

(72) Inventors: Matthew W. Jaeger, Oshkosh, WI (US); Bradley R. Stafford, Omro, WI (US); Caleb J. VanSomeren, Oakfield, WI (US)

(73) Assignee: Brunswick Corporation, Mettawa, IL (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/028,694

(22) Filed: Sep. 22, 2020

(51) Int. Cl.
*B63H 20/28* (2006.01)
*B63H 20/26* (2006.01)
*B63H 20/32* (2006.01)

(52) U.S. Cl.
CPC ........... *B63H 20/285* (2013.01); *B63H 20/26* (2013.01); *B63H 20/32* (2013.01); *B63H 2020/323* (2013.01)

(58) Field of Classification Search
CPC ...... B63H 20/285; B63H 20/28; B63H 20/26; B63H 20/32; B63H 2020/323; B63H 2020/006
See application file for complete search history.

(56) References Cited

U.S. PATENT DOCUMENTS

| | | | | |
|---|---|---|---|---|
| 1,567,512 A | * | 12/1925 | Johnson | F01P 3/202 |
| | | | | 123/41.35 |
| 2,050,670 A | * | 8/1936 | Rayniak | B63H 20/32 |
| | | | | 416/93 R |
| 3,240,181 A | * | 3/1966 | Chandler | F01P 3/202 |
| | | | | 440/89 C |
| 4,498,875 A | * | 2/1985 | Watanabe | F02B 61/045 |
| | | | | 440/88 L |
| 5,911,610 A | | 6/1999 | Fujimoto | |
| 6,890,228 B2 | | 5/2005 | Tawa et al. | |
| 6,921,306 B2 | | 7/2005 | Tawa et al. | |
| 7,001,231 B1 | | 2/2006 | Halley et al. | |
| 7,114,469 B1 | | 10/2006 | Taylor | |
| 7,264,520 B1 | | 9/2007 | Taylor et al. | |

(Continued)

FOREIGN PATENT DOCUMENTS

EP  1398471 A1 * 3/2004 ............. B63H 20/28

*Primary Examiner* — Stephen P Avila
(74) *Attorney, Agent, or Firm* — Andrus Intellectual Property Law LLC

(57) ABSTRACT

A marine propulsion device is provided. The device includes an engine, a driveshaft that is caused to rotate by the engine, a cowling system, a gearcase that supports a propulsor for imparting a propulsive force in a body of water, and a cooling water circuit that conveys cooling water that exchanges heat with the engine. The cooling water circuit includes an engine dump hose that extends from a first end to a second end. The first end is coupled to a cooling water outlet of the engine. The cooling water circuit further includes an egress component configured to discharge the cooling water from the device at a discharge angle relative to a vertical axis. The egress component extends through one or more components of the cowling system and is coupled to the second end of the engine dump hose.

19 Claims, 5 Drawing Sheets

(56) References Cited

U.S. PATENT DOCUMENTS

| | | | |
|---|---|---|---|
| 7,318,396 | B1 | 1/2008 | Belter et al. |
| 8,038,493 | B1 | 10/2011 | Broman et al. |
| 8,388,393 | B1 | 3/2013 | Eichinger et al. |
| 8,402,930 | B1 | 3/2013 | Taylor et al. |
| 8,479,691 | B1 | 7/2013 | Taylor et al. |
| 8,500,501 | B1 | 8/2013 | Taylor et al. |
| 8,540,536 | B1 * | 9/2013 | Eichinger ............. F01N 13/004 440/88 J |
| 8,696,394 | B1 | 4/2014 | Langenfeld et al. |
| 8,763,566 | B1 | 7/2014 | Taylor et al. |
| 8,783,217 | B1 | 7/2014 | Taylor et al. |
| 9,365,275 | B1 | 6/2016 | Habeck et al. |
| 9,903,251 | B1 | 2/2018 | Belter et al. |
| 10,233,818 | B1 | 3/2019 | Reichardt et al. |
| 10,329,978 | B1 | 6/2019 | Reichardt et al. |
| 10,378,423 | B1 | 8/2019 | Reichardt et al. |

\* cited by examiner

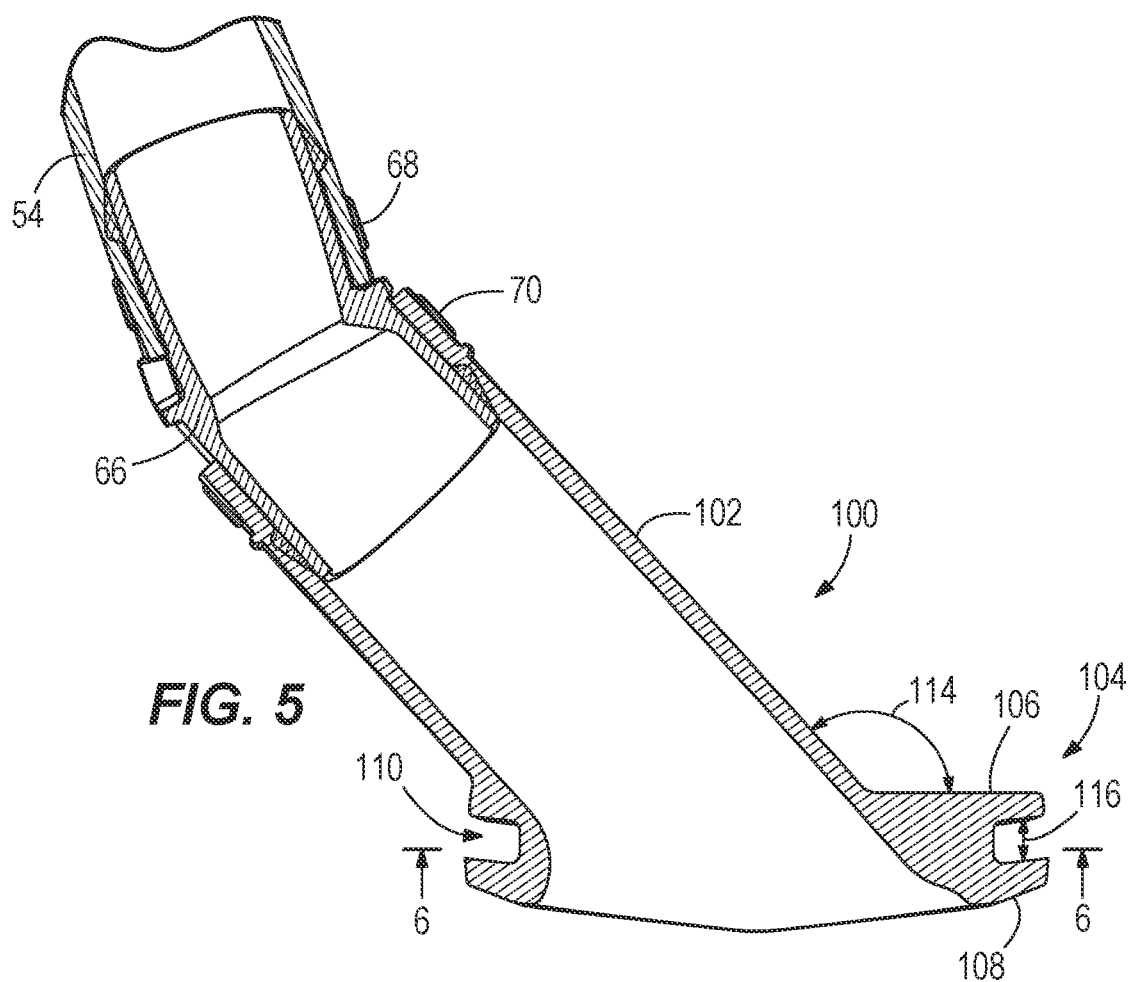
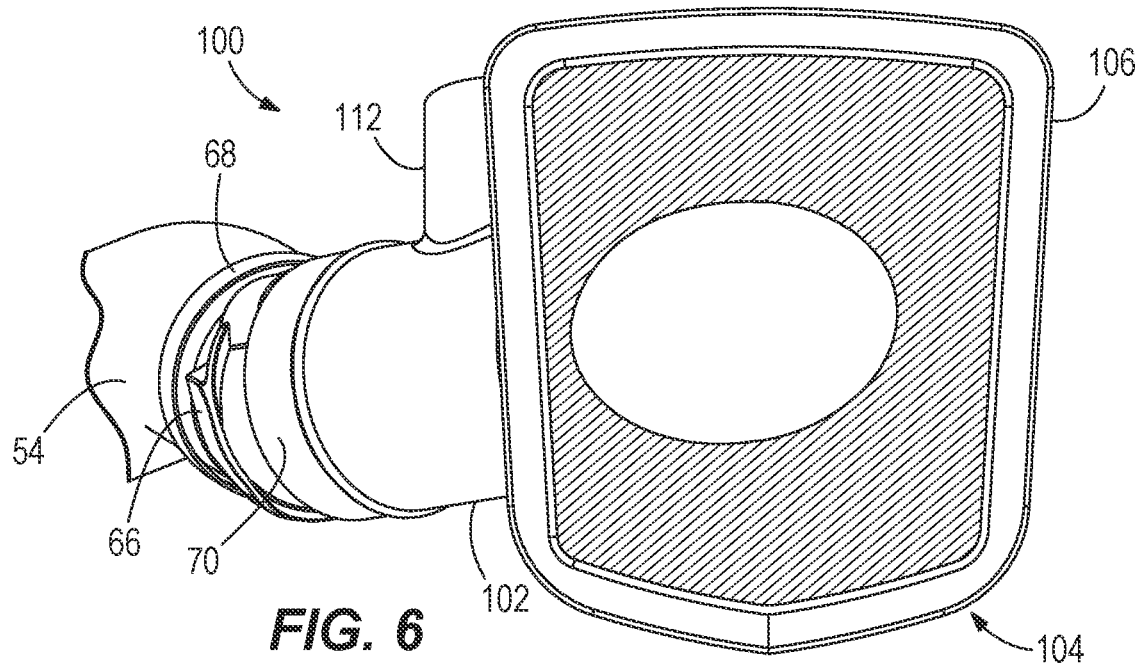

OUTBOARD MOTOR COWLING WITH COOLING WATER EGRESS SYSTEM

FIELD

The present disclosure relates to marine propulsion devices, and more particularly to outboard motors having systems for the egress of water from the motor cowlings.

BACKGROUND

U.S. Pat. No. 9,365,275 discloses an outboard marine propulsion device comprises an internal combustion engine having a cylinder head and a cylinder block; and an exhaust manifold that discharges exhaust gases from the engine towards a vertically extending catalyst housing. The exhaust manifold has a plurality of horizontally extending inlet runners upwardly that receive the exhaust gases from the engine, and a vertically extending collecting passage that conveys the exhaust gases from the plurality of horizontally extending inlet runners to a bend that redirects the exhaust gases downwardly towards the catalyst housing.

U.S. Pat. No. 8,783,217 discloses a cooling system for a marine engine is provided with various cooling channels and passages which allow the rates of flow of its internal streams of water to be preselected so that heat can be advantageously removed at varying rates for different portions of the engine. In addition, the direction of flow of cooling water through the various passages assists in the removal of heat from different portions of the engine at different rates so that overheating can be avoided in certain areas, such as the exhaust manifold and cylinder head, while overcooling is avoided in other areas, such as the engine block U.S. Pat. No. 8,540,536 discloses a cooling system for a marine engine that has an elongated exhaust conduit comprising a first end receiving hot exhaust gas from the marine engine and a second end discharging the exhaust gas; and an elongated cooling water jacket extending adjacent to the exhaust conduit. The cooling water jacket receives raw cooling water at a location proximate to the second end of the exhaust conduit, conveys raw cooling water adjacent to the exhaust conduit to thereby cool the exhaust conduit and warm the raw cooling water, and thereafter discharges the warmed cooling water to cool the internal combustion engine.

U.S. Pat. No. 8,500,501 discloses an outboard marine drive includes a cooling system drawing cooling water from a body of water in which the outboard marine drive is operating, and supplying the cooling water through cooling passages in an exhaust tube in the driveshaft housing, a catalyst housing, and an exhaust manifold, and thereafter through cooling passages in the cylinder head and the cylinder block of the engine. A 3-pass exhaust manifold is provided. A method is provided for preventing condensate formation in a cylinder head, catalyst housing, and exhaust manifold of an internal combustion engine of a powerhead in an outboard marine drive.

U.S. Pat. No. 8,388,393 discloses an outboard motor that includes an internal combustion engine, a driveshaft housing, a molded adapter plate connecting the internal combustion engine and the driveshaft housing; and an elongated exhaust conduit conveying hot exhaust gas from the internal combustion engine, the exhaust conduit extending from a first end portion located proximate to the internal combustion engine to a second end portion located proximate to the driveshaft housing. The exhaust conduit and adapter plate are separate components.

U.S. Pat. No. 7,114,469 discloses a cooling system for a marine engine that divides a flow of cooling water into first and second streams downstream of a pump. The first stream flows through a first cooling system which is controlled by a pressure sensitive valve. The second stream flows through a second cooling system which is controlled by a temperature sensitive valve.

Each of the above patents is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one implementation of the present disclosure, a marine propulsion device is provided. The device includes an engine, a driveshaft that is caused to rotate by the engine, a cowling system, a gearcase that supports a propulsor for imparting a propulsive force in a body of water, and a cooling water circuit that conveys cooling water that exchanges heat with the engine. The cooling water circuit includes an engine dump hose that extends from a first end to a second end. The first end is coupled to a cooling water outlet of the engine. The cooling water circuit further includes an egress component configured to discharge the cooling water from the device at a discharge angle relative to a vertical axis. The egress component extends through one or more components of the cowling system and is coupled to the second end of the engine dump hose.

According to another implementation of the present disclosure, a water egress component for a marine propulsion device is provided. The water egress component includes a mounting base having an upper flange, a lower flange, and a channel formed between the upper and lower flanges. The mounting base is configured such that a cowling component of the marine propulsion device fits in the channel between the upper and lower flanges. The water egress component further comprises a main body extending from the mounting base at a main body angle relative to the mounting base. The main body is configured to be fluidly coupled to a hose component to direct a flow of cooling water out of the marine propulsion device.

According to yet another implementation of the present disclosure, a marine propulsion device is provided. The marine propulsion device includes an engine and a driveshaft that is caused to rotate by the engine, a cowling system that at least partially covers a portion of the engine and the driveshaft and includes one or more lower cowling components. The marine propulsion device further comprises a gearcase that supports a propulsor for imparting a propulsive force in a body of water; and an egress component configured to discharge water used to cool the engine from the marine propulsion device at a discharge angle relative to a vertical axis. The egress component extends through the one or more lower cowling components, and the one or more lower cowling components define a gravity drain positioned above the gearcase. The gravity drain is configured to permit water trapped within the cowling system to drain out of the marine propulsion device.

BRIEF DESCRIPTION OF THE DRAWINGS

The present disclosure is described with reference to the following Figures. The same numbers are used throughout the Figures to reference like features and like components.

FIG. 5 is a side cross-sectional view taken along the line 5-5 of FIG. 4.

FIG. 6 is bottom cross-sectional view taken along the line 6-6 of FIG. 5.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
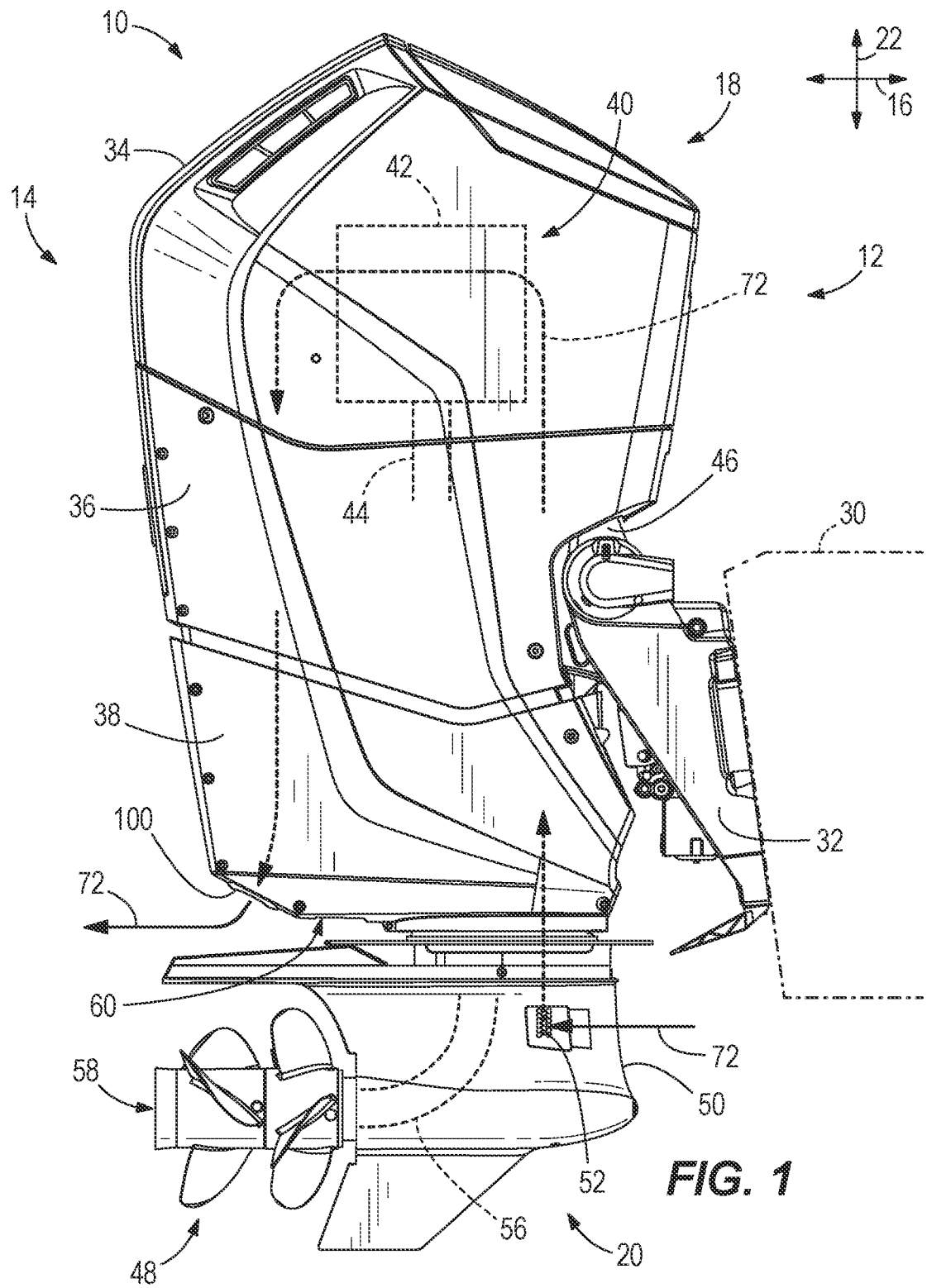
FIG. 1 is a starboard side view of an outboard motor having a cooling water egress system according to an exemplary implementation of the present disclosure.
Figure 3:
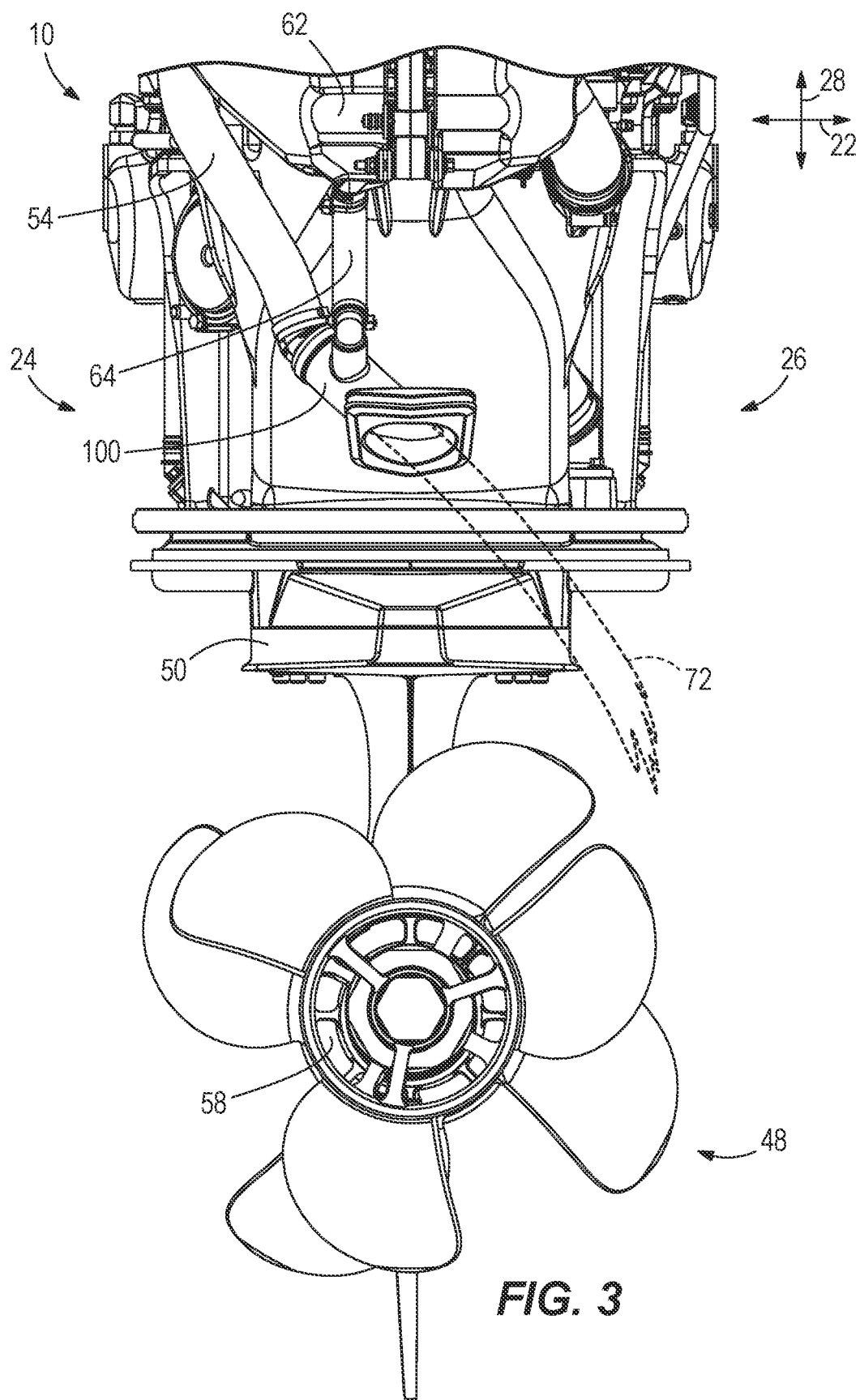
FIG. 3 is a rear view illustrating the cooling water egress system of FIG. 1.

FIG. 1 depicts a starboard side view of an outboard motor or propulsion device 10 in accordance with an exemplary preferred embodiment of the present disclosure. In general, the outboard motor 10 extends between a forward side 12 and an aftward side 14 along a fore-aft axis 16, and between an upper side 18 and a lower side 20 along a vertical axis 22. As shown in FIG. 3, orthogonal to the fore-aft axis 16 and the vertical axis 22, the outboard motor 10 extends between a port side 24 and a starboard side 26 in a lateral direction along a port-starboard axis 28. The outboard motor 10 is configured to be coupled to a transom 30 of a marine vessel via a transom bracket 32. A trim actuator may be coupled to the outboard motor 10 and the transom bracket 32 to trim the outboard motor 10 about a trim axis parallel to the port-starboard axis 28.

The outboard motor 10 is has a cowling system with an upper cowling portion 34, mid cowling portion 36, and lower cowling portion 38. Collectively, the components 34-38 of the cowling system protect and encapsulate the various components and assemblies of the outboard motor 10, described in further detail below. Each of the upper cowling 34, mid cowling 36, and lower cowling 38 may include one or more separate components that are coupled to each other.

The upper cowling portion 34 covers a propulsion unit 40 including, for example, an internal combustion engine 42. As is conventional, the engine 42 includes an engine block having vertically-aligned banks of piston-cylinders that extend at an angle with respect to each other so as to form a V-shape. The number of piston-cylinders can vary, and together can form a conventional configuration (e.g., V-6, V-8, V-10, V-12). The engine 42 causes rotation of a generally elongated driveshaft 44. In an exemplary implementation, the engine 42 is supported by an isolation mounting cradle 46 that is coupled to the transom bracket 32. The isolation mounting cradle 46 dampens vibrations induced by the engine 42 and other components to reduce the transmission of induced resonance and vibration running through the hull, cabin, and instruments of the marine vessel, resulting in quieter, more comfortable travel. The present invention is not limited for use with outboard motors having isolation mounting cradles.

Rotation of the driveshaft 44 about a driveshaft axis powers a propulsor assembly 48 that is operably connected to the driveshaft 44 by a transmission gearset located in a lower gearcase 50. In the illustrated example, the propulsor assembly 48 includes multiple propellers. The type and configuration of the marine drive shown in the figures is for explanatory purposes only and can vary from what is shown. Advantageously, the lower gearcase 50 may be steerable, that is, rotatable around an axis parallel to the driveshaft axis in order to control the direction of the propulsive force imparted to the marine vessel by the propulsor assembly 48 along the port-starboard axis 28.

During continued research and development, the present inventors have recognized that the use of a steerable lower gearcase presents several challenges when managing a flow of water used to cool the engine of an outboard motor, among other components. As this cooling water can quickly reach temperatures in excess of 80° C., a large volumetric water flow is required to both exchange the heat to the cooling water and also to avoid excessive engine component and cooling water temperatures. Past systems have combined the cooling water discharged from the engine with exhaust gases and directed the mixture through an exhaust passage that terminated in an underwater discharge outlet extending through the propulsion unit. However, the incorporation of a steerable lower gearcase in the outboard motor results in backpressure conditions in the exhaust passage that may degrade engine power output when the gearcase is rotated toward the port or starboard sides of the marine vessel. In addition, use of a steerable lower gearcase greatly restricts the overall space available for routing exhaust gases and cooling water through the gearcase.

Therefore, the present inventors conceived of the presently disclosed, improved water egress system for the outboard motor 10 having a steerable lower gearcase 50. As depicted in FIG. 1, cooling water from the body of water in which the marine vessel is located may be drawn through cooling water inlets 52 formed in the lower gearcase 50. As indicated by flow arrow 72, the cooling water is directed upwardly to the engine 42 to exchange heat with and thereby cool the engine 42. In various implementations, one or more of the following outboard motor 10 components may be cooled by the cooling water as part of a cooling water circuit: engine block, cylinder heads, exhaust assembly, engine oil cooler, transmission cooler, fuel supply cooler, and steering fluid cooler. Once discharged from the top of the cylinder head of the engine 42, the water flows downwardly through an engine dump hose 54 (depicted in FIG. 2) and out of the lower cowling portion 38 via an egress component 100 that is mounted to the lower cowling portion 38 above the steerable lower gearcase 50. Further description of the egress component 100 is included below with reference to FIGS. 4-6. At the same time, engine exhaust gases are mixed with a small amount of cooling water spray and directed through an exhaust passage 56 extending through the lower gearcase 50 that terminates in an outlet 58 formed in the propulsor assembly 48. Existing systems for mixing exhaust gases with cooling water spray are disclosed in U.S. Pat. Nos. 10,378,423; 10,329,978; 10,233,818; 9,903,251; and 9,365,275, each of which is incorporated by reference herein. In an exemplary implementation, approximately 12% of the cooling water that would otherwise exit through the egress component 100 is directed to the exhaust passage 56 to exit through the outlet 58 under wide-open throttle, that is, maximum cooling water flow, conditions.

The present inventors have further recognized that when the outboard motor 10 is at rest in a body of water, a large volume of water may become trapped between the mid and lower cowling portions 36, 38 and the motor components encapsulated by these portions 36, 38. For example, the longest driveshaft model of the outboard motor 10 may trap approximately (±15%) 106 L of water. This trapped water must be quickly drained from the outboard motor 10 so that the weight of the trapped water is not supported by the lower cowling portion 38, thereby leading to possible cowling damage. Since modeling and experimentation completed by the inventors have indicated that the time to plane a marine vessel is approximately 5 seconds, this results in a target drain rate of the trapped water of 21 L/s.

To achieve this target drain rate, the inventors have further provided a gravity drain 60 (depicted in FIG. 1) formed in the lower cowling portion 38 and positioned forwardly of the mounting location of the egress component 100. In an exemplary implementation, the size of the gravity drain 60 is approximately 10,145 mm². Physical testing completed by the inventors has verified that the size and position of the gravity drain 60 within the lower cowling portion 38 exceeds the 21 L/s target drain rate and is sufficient to drain both the trapped water when the marine vessel rises up on plane plus external sprayer cooling water flow. The external sprayer water flow is from the oil sump, transmission casing, and fuel module showers during normal engine operation.

Figure 2:
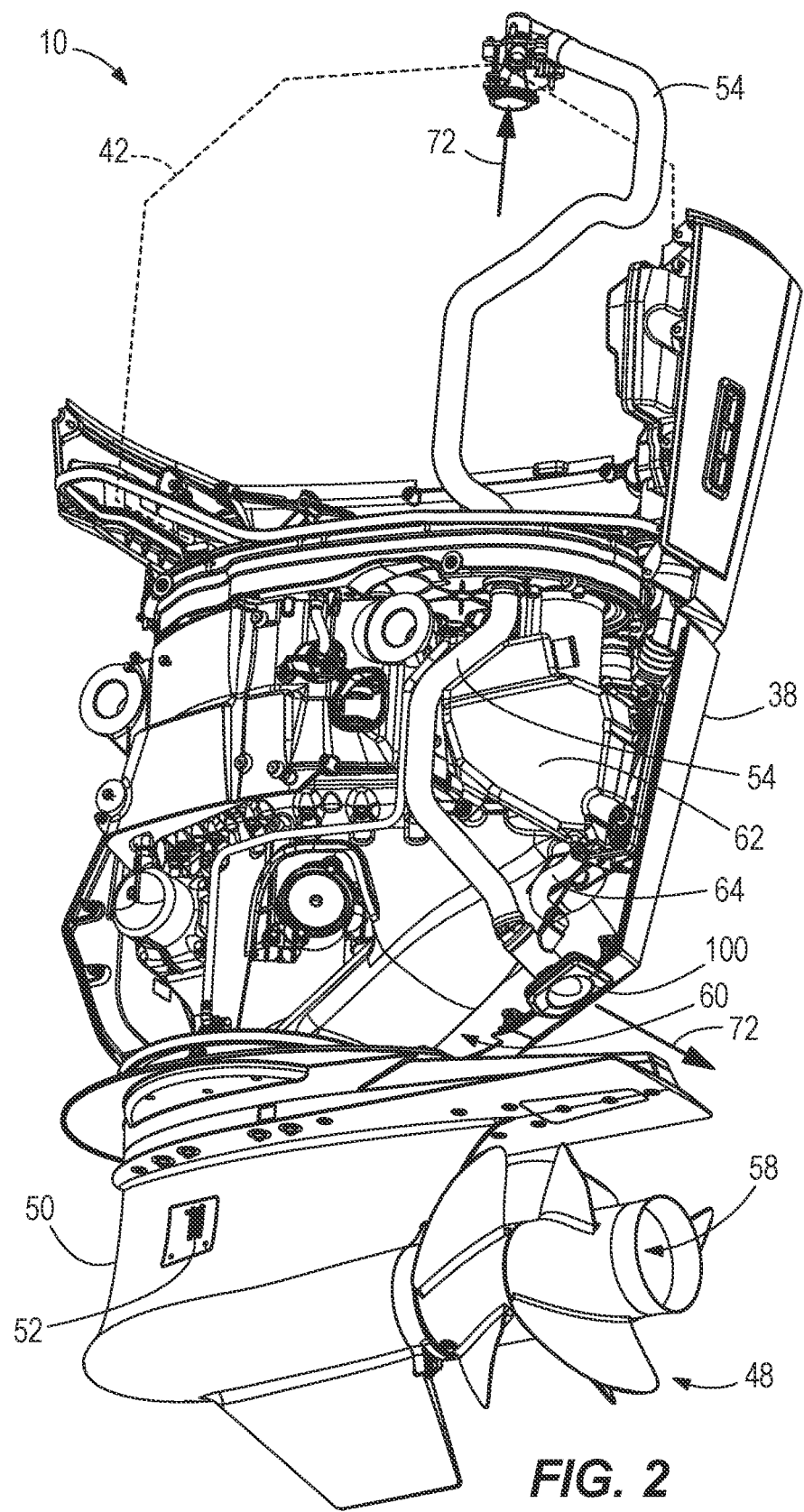
FIG. 2 is port side perspective view illustrating the cooling water egress system of FIG. 1 including an egress component.

As shown in FIG. 2, in some implementations, additional components of the outboard motor 10 apart from the engine 42 may be integrated into the cooling water circuit indicated by flow arrows 72. For example, the outboard motor 10 may include a muffler system 62 that is positioned below the engine 42 and aft of the engine dump hose 54. The muffler system 62 may reduce the noise emitted by the engine 42. Like the engine 42, the muffler system 62 may be cooled by a portion of the cooling water drawn from the body of water through the cooling inlets 52 formed in the lower gearcase 50. A portion of the cooling water flow 72 that exits the engine 42 is used to cool plus attenuate noise emanating from two idle relief mufflers in a saddle bag arrangement with a crossover pipe and one water dump house. Flow for the idle relief mufflers branches off a main discharge, passes through the mufflers, and then a portion of that flow returns to the main discharge via a muffler dump hose 64. Another portion of the flow exits via an idle relief outlet. As such, the muffler system 62 is shown to be coupled to the muffler dump hose 64 that, like the engine dump hose 54, is coupled to the egress component 100 for the purpose of discharging cooling water through the egress component 100.

Turning now to FIG. 3, a rear view of the lower portion of the outboard motor 10 is depicted. As shown, cooling water flow 72 from the engine 42 and the muffler system 62 is directed to the egress component 100 via the engine dump hose 54 and muffler dump hose 64. This cooling water flow 72 can reach very high flow rates (e.g., up to approximately 140 L/min.) Advantageously, the geometry of the egress component 100 (explained in greater detail below with reference to FIGS. 4-6) ensures that the cooling water flow 72 does not exit vertically downward along the vertical axis 22 and onto the lower gearcase 50. Instead, the egress component 100 directs the flow 72 at an angle such that the flow travels along both the vertical and port-starboard axes 22, 28 such that the flow does not contact the propulsor assembly 48 or the gearcase 50 when steerable gearcase 50 is oriented parallel to the fore-aft axis 16. Additionally, when the marine vessel is on plane, normal water spray from the marine vessel and the gearcase 50 moving forward through the body of water converges with the cooling water flow 72 through the egress component 100 and thereby creates a well dispersed water spray in the local area of the egress component 100 and the gearcase 50. Further, although some cooling water flow 72 through the egress component 100 will vector onto the gearcase 50 when the gearcase 50 is steered toward the starboard direction 26, the water spray dispersion limits the effect of direct spray, preventing a hard directed jet impingement from the cooling water flow 72 through the egress component 100 onto the gearcase 50. Although FIG. 3 depicts the flow 72 as traveling toward the starboard side 26 of the marine vessel, in other implementations, the flow 72 may be directed toward the port side 24 of the marine vessel.

Figure 4:
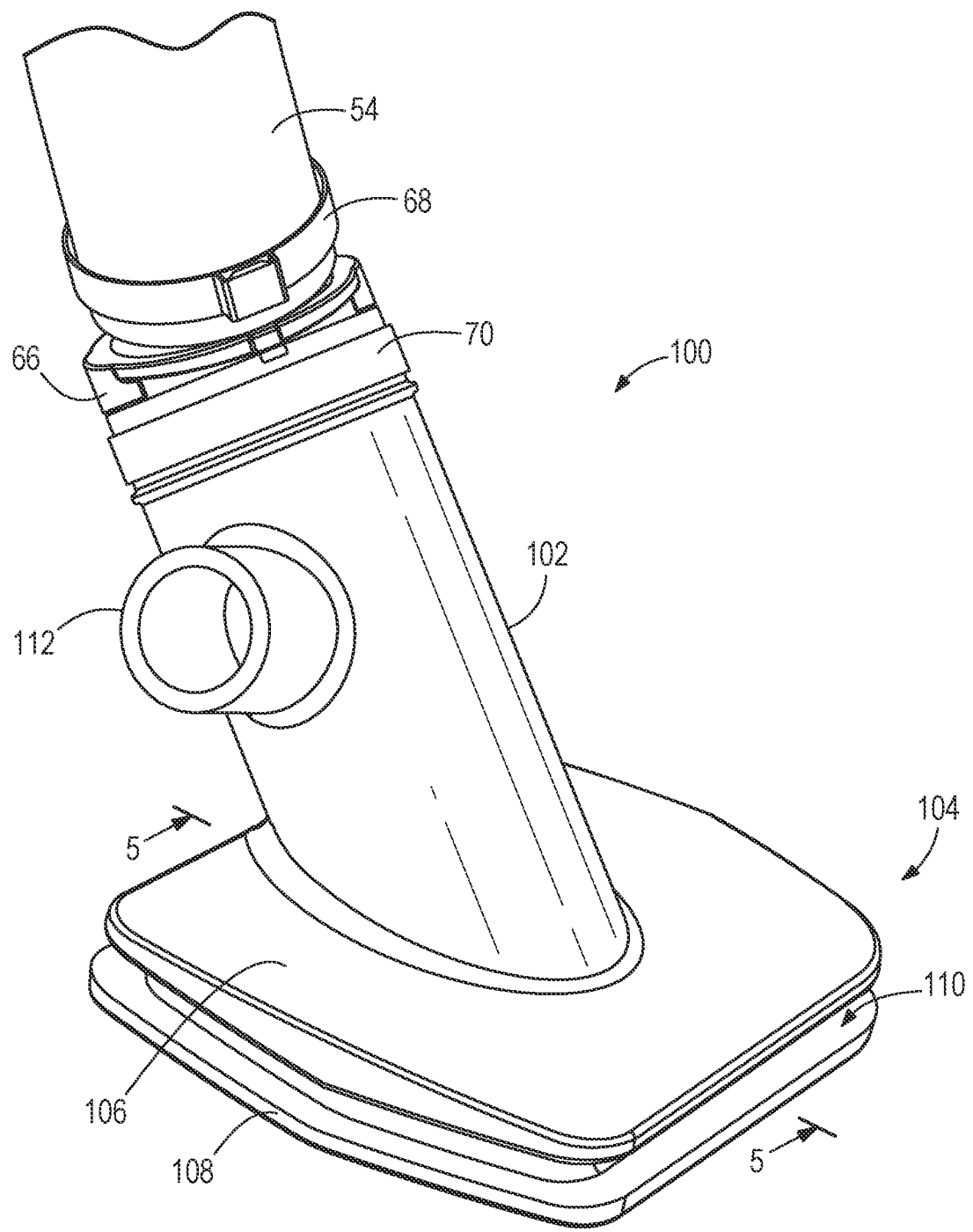
FIG. 4 is a perspective view depicting the egress component of FIG. 2.

Referring now to FIGS. 4-6, various views of the egress component 100 are depicted. Specifically, FIG. 4 depicts a perspective view, while FIG. 5 depicts a side cross-sectional view, and FIG. 6 depicts a bottom cross-sectional view. As shown, the egress component 100 includes a substantially tube-like main body 102 extending from a mounting base 104. As best shown in FIG. 5, an angle 114 between the main body 102 and the mounting base 104 is approximately 132°±3°. The main body 102 is provided to couple the egress component 100 to the engine dump hose 54. When mounted to the lower cowling portion 38, the angle 114 ensures that the cooling water flow 72 is directed away from the propulsor assembly 48 and the gearcase 50, as depicted in FIG. 3. In an exemplary implementation, the engine dump hose 54 has a nominal inner diameter of 31.75 mm±0.6 mm, and a nominal outer diameter of 37.75 mm±0.8 mm, while the main body 102 of the egress component 100 has a nominal inner diameter of 38.0 mm±0.5 mm and a nominal outer diameter of 44.0 mm±0.5 mm.

The mounting base 104 is provided to couple the egress component 100 to the lower cowling portion 38 and includes an upper flange 106 and a lower flange 108 such that a channel 110 is formed around the periphery of the base therebetween. When installed in the outboard motor 10, the lower cowling portion 38 resides within the channel 110 such that the upper flange 106 resides within an interior region of the outboard motor 10 and the lower flange 108 is positioned on an exterior surface of the cowling portion 38. As such, a distance 116 between the upper and lower flanges 106, 108 may be controlled according to a thickness of the cowling portion 38 such that the lower cowling portion 38 is securely held within the channel 110. In an exemplary implementation, the distance 116 has a nominal value of 6.6 mm±0.5 mm.

As specifically depicted in FIGS. 4 and 5, coupling of the engine dump hose 54 and the egress component 100 may be achieved via a union fitting 66 that is inserted into both the dump hose 54 and the main body 102. The coupling of the union fitting 66 to the hose 54 and egress component 100 may be secured using a first hose clamp 68 positioned over the hose 54 and a second hose clamp 70 positioned over the main body 102 to prevent leakage of the cooling water within the cowling surrounding outboard motor 10. Any suitable clamp type may be utilized for the clamps 68, 70, including, but not limited to, bolted clamps, worm drive clamps, pinch clamps, and spring clamps.

The egress component 100 is further shown to include a branching body 112 extending generally orthogonally from the main body 102. In an exemplary implementation, the branching body 112 has a nominal inner diameter of 19.0 mm±0.25 mm and a nominal outer diameter of 25.0 mm±0.25 mm. The branching body 112 may be connected to the muffler dump hose 64 for the purpose of directing cooling water exchanged with the muffler system 62 out of the outboard motor 10. In an exemplary implementation, the branching body 112 may be coupled to the muffler dump hose 64 using a union fitting and one or more hose clamps.

Although the egress component 100 is shown to include a single branching body 112, in further implementations, the egress component 100 may include additional branching bodies, depending on the number of liquid cooled components of the outboard motor 10.

In an exemplary implementation, the egress component 100 is fabricated as a single component out of rubber using a molding process. The rubber may be a 70 Shore A durometer nitrile rubber compound. A nitrile rubber compound provides several advantages for use in a marine environment, including resistance to damage from high engine water temperatures, marine oils and fuels. A neoprene rubber compound may exhibit similar satisfactory characteristics, and may be utilized rather than a nitrile rubber compound. In other implementations, the egress component 100 may be fabricated as multiple components that are subsequently assembled, or may be fabricated using a different manufacturing process. Each of the engine dump hose 54 and the muffler dump hose 64 may have a fabric-reinforced coaxial construction per the SAE J20 standard for coolant system hoses. The rubber portion of the hoses 54, 64 may be ethylene propylene diene monomer (EPDM), although an alternate compound may be utilized. In an exemplary implementation, the union fitting 66 and the muffler system union fitting may be fabricated from 30% glass reinforced nylon 6,6 (Zytel 70G33) using an injection molding process.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A marine propulsion device, comprising:
   an engine and a driveshaft that is caused to rotate by the engine;
   a cowling system that at least partially covers a portion of the engine and the driveshaft, the cowling system having one or more lower cowling components;
   a gearcase that supports a propulsor for imparting a propulsive force in a body of water; and
   a cooling water circuit that conveys cooling water that exchanges heat with the engine, the cooling water circuit comprising:
     an engine dump hose that extends from a first end to a second end, wherein the first end is operably coupled to a cooling water outlet of the engine; and
     an egress component configured to discharge the cooling water from the marine propulsion device at a discharge angle relative to a plane that bisects the marine propulsion device into a port side and a starboard side, wherein the egress component extends through the one or more lower cowling components and is coupled to the second end of the engine dump hose.

2. The marine propulsion device of claim 1, wherein the egress component discharges the cooling water from the marine propulsion device at the discharge angle such that the cooling water does not flow onto the gearcase or the propulsor.

3. The marine propulsion device of claim 1, wherein the cooling water circuit further comprises a plurality of cooling water inlets formed in the gearcase through which the cooling water is drawn.

4. The marine propulsion device of claim 1, wherein the marine propulsion device further comprises a muffler assembly that exchanges heat with the cooling water.

5. The marine propulsion device of claim 4, wherein the cooling water circuit further comprises a muffler dump hose extending from a first end to a second end, wherein the first end is operably coupled to a cooling water outlet of the muffler assembly and the second end is operably coupled to the egress component.

6. The marine propulsion device of claim 1, wherein the one or more lower cowling components define a gravity drain positioned above the gearcase, the gravity drain configured to permit water trapped within the cowling system to drain out of the marine propulsion device.

7. The marine propulsion device of claim 6, wherein the gravity drain is configured such that a drain rate through the gravity drain exceeds 21 L/s.

8. The marine propulsion device of claim 1, wherein the marine propulsion device further comprises an exhaust passage configured to discharge exhaust gases from the engine through the propulsor.

9. The marine propulsion device of claim 8, wherein a portion of the cooling water is mixed with the exhaust gases.

10. A water egress component for a marine propulsion device, comprising:
    a mounting base comprising an upper flange, a lower flange, and a channel formed between the upper and lower flanges, the mounting base is configured such that a cowling component of the marine propulsion device fits in the channel between the upper and lower flanges; and
    a main body extending from the mounting base at a main body angle relative to the mounting base, wherein the main body is configured to be fluidly coupled to a hose component to direct a flow of cooling water out of the marine propulsion device.

11. The water egress component of claim 10, further comprising a branching body extending from the main body, the branching body configured to be fluidly coupled to a second hose component.

12. The water egress component of claim 10, wherein the main body angle ranges from 129 degrees to 135 degrees.

13. The water egress component of claim 10, wherein the water egress component is fabricated from rubber using a molding process.

14. The water egress component of claim 10, wherein an outer diameter of the main body ranges from 43.5 mm to 44.5 mm.

15. The water egress component of claim 11, wherein an outer diameter of the branching body ranges from 24.75 mm to 25.25 mm.

16. A marine propulsion device, comprising:
    an engine and a driveshaft that is caused to rotate by the engine;
    a cowling system that at least partially covers a portion of the engine and the driveshaft, the cowling system having one or more lower cowling components;
    a gearcase that supports a propulsor for imparting a propulsive force in a body of water; and
    an egress component configured to discharge water used to cool the engine from the marine propulsion device at a discharge angle relative to a vertical axis such that the cooling water does not flow onto the gearcase or the propulsor, wherein the egress component extends through the one or more lower cowling components;

wherein the one or more lower cowling components define a gravity drain positioned above the gearcase, the gravity drain configured to permit water trapped within the cowling system to drain out of the marine propulsion device.

17. The marine propulsion device of claim 16, wherein the gravity drain is configured such that a drain rate through the gravity drain exceeds 21 L/s.

18. The marine propulsion device of claim 16, wherein the marine propulsion device further comprises an exhaust passage configured to discharge exhaust gases from the engine through the propulsor.

19. The marine propulsion device of claim 16, further comprising a plurality of cooling water inlets formed in the gearcase and configured to draw the water used to cool the engine from a body of water.

\* \* \* \* \*